(No Model.)
L. F. DAGNAN.
ANIMAL TRAP.
No. 538,241. Patented Apr. 30, 1895.
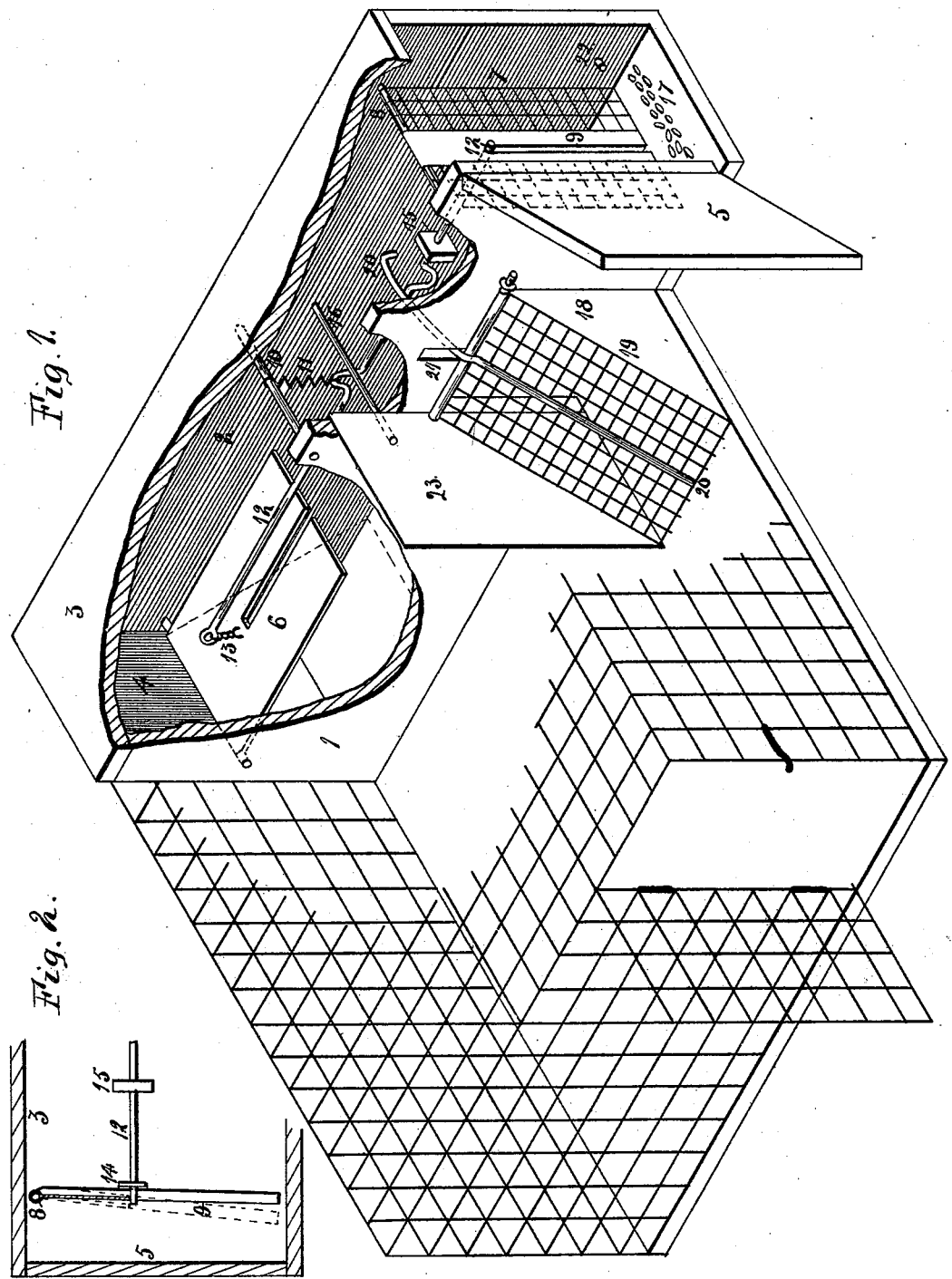
Witnesses:
I. Sovereign
E. Behel.
Inventor:
Louis F. Dagnan
By A. O. Behel
atty.

UNITED STATES PATENT OFFICE.

LOUIS F. DAGNAN, OF ROCKFORD, ILLINOIS.

ANIMAL-TRAP.

SPECIFICATION forming part of Letters Patent No. 538,241, dated April 30, 1895.

Application filed January 14, 1895. Serial No. 534,875. (No model.)

*To all whom it may concern:*

Be it known that I, LOUIS F. DAGNAN, a citizen of the United States, residing at Rockford, in the county of Winnebago and State of Illinois, have invented certain new and useful Improvements in Animal-Traps, of which the following is a specification.

The object of this invention is to construct an animal trap in which a door is held open until released by the animal entering the trap, and reset by the animal passing into the receiving cage.

In the accompanying drawings, Figure 1 is an isometrical representation of a trap embodying my improvements, in which parts are broken away to more clearly show the construction and workings of the parts. Fig. 2 is a vertical section of a portion of that end of the trap supporting the outer door releasing device.

My improved trap consists of two compartments, the receiving cage, and the entrance thereto. The receiving cage may be of any known construction. The entrance to the receiving cage in this instance has closed sides 1 and 2, top 3, stationary end 4, and hinged door 5. To the end 4, is hinged a door 6, and when closed stands in the position shown in dotted lines.

Near the end having the hinged door 5, and same distance from the end is located a swinging partition 7, suspended at its upper end by a rod 8. This partition has a metallic center provided with a lengthwise slot 9, formed by the metal bent inward forming a guideway the length of the partition. On each side of this center partition extends a section of woven wire which fills in the space between the metallic center and the sides of the entrance.

A rod 10, is supported by the sides of the entrance and from the center of which is suspended a spring 11. The lower end of the spring is connected to a lengthwise rod 12, about midway of its length. One end of this rod has a connection with the door 6, by a linked connection 13. The other end of the rod is guided by the swinging partition and has a stop 14, holding the partition in proper relation with the end of the rod. A weight 15, is placed on the rod near the partition end, which is used to counterbalance the weight of the door 6. A rod 16, is supported by the sides of the entrance and is located near the central support of the rod, and acts to limit the movement of the rod 12, toward the partition end. Thus far described, when an animal enters the entrance it will be attracted by the bait 17, placed between the partition and the hinged door 5, and will seek to obtain the bait and in doing so will push upon the partition 7, until the end of the rod 12 is released, which will allow the door to drop, thereby entrapping the animal in the entrance, and when it finds that it cannot reach the bait it will look for an escape which will be impossible as the door 6 has been closed, and its only escape from the entrance will be into the reception cage, and the manner of entering the cage will now be described. The side 1 of the entrance in this instance also forms one end of the receiving cage and an opening 18 is cut in this side to form a passage way from the entrance into the receiving cage. Over this opening on the receiving cage side, is hinged a fall-door 19, made of wire. A dividing board 23, is placed in the receiving cage which in connection with the side of the receiving cage incloses the drop door, compelling the animal to raise the door and pass into the receiving cage. To this drop door is secured a rod 20, which extends through an opening 21, in the side 1, into the entrance compartment, and overlies the rod 12, at the partition side of its central support.

When the door 6, has been closed the free end of the rod, 12, will be elevated and guided in a vertical direction and in line with the lengthwise opening in the swinging partition, and when the animal in passing into the receiving cage raises the drop door 19, the end of the rod 20, extending within the entrance compartment will be depressed which will depress the free end of the rod 12, so that it will extend through the lengthwise opening 9, of the swinging partition, and upon the dropping of the door 19, the free end of the rod 12, will engage the solid end of the lengthwise slot, thereby resting and holding the door 6, open, and the operation will be repeated at the entrance of each animal. The swinging partition is so provided that its weight will insure engagement with the free end of the rod, when it is depressed.

A pin 22, limits the swinging of the partition in one direction.

I claim as my invention—

In an animal trap, an entrance compartment, and a receiving cage, an outer door to the entrance compartment, and a door leading from the entrance compartment into the receiving cage, a swinging partition located near the end of the entrance compartment opposite the outer door forming a big chamber, a rod forming a connection between the outer door and the swinging partition, whereby the outer door is held open and capable of being closed upon the movement of the swinging partition, and a connection between the door leading into the receiving cage and the rod, whereby the outer door is reset upon the opening of the division door.

LOUIS F. DAGNAN.

Witnesses:
A. O. BEHEL,
E. BEHEL.